United States Patent
Buer et al.

(10) Patent No.: US 9,344,747 B2
(45) Date of Patent: May 17, 2016

(54) MOBILE PAYTV DRM ARCHITECTURE

(71) Applicant: Broadcom Corporation, Irvine, CA (US)

(72) Inventors: Mark Leonard Buer, Payson, AZ (US); Andrew Dellow, Minchinhampton (GB); Jacob Mendel, Kibutz Givat Brenner (IL)

(73) Assignee: Broadcom Corporation, Irvine, CA (US)

( * ) Notice: Subject to any disclaimer, the term of this patent is extended or adjusted under 35 U.S.C. 154(b) by 419 days.

(21) Appl. No.: 13/859,675

(22) Filed: Apr. 9, 2013

(65) Prior Publication Data

US 2014/0233732 A1    Aug. 21, 2014

Related U.S. Application Data

(60) Provisional application No. 61/767,703, filed on Feb. 21, 2013.

(51) Int. Cl.
| H04N 7/167 | (2011.01) |
|---|---|
| G06F 11/30 | (2006.01) |
| H04N 21/2347 | (2011.01) |
| H04N 21/2543 | (2011.01) |
| H04N 21/41 | (2011.01) |
| H04N 21/4627 | (2011.01) |

(52) U.S. Cl.
CPC ....... *H04N 21/2347* (2013.01); *H04N 21/2543* (2013.01); *H04N 21/4126* (2013.01); *H04N 21/4627* (2013.01)

(58) Field of Classification Search
None
See application file for complete search history.

(56) References Cited

U.S. PATENT DOCUMENTS

| 7,162,452 | B1* | 1/2007 | Epstein | 705/52 |
|---|---|---|---|---|
| 7,937,595 | B1 | 5/2011 | Kumar et al. | |
| 8,843,767 | B2* | 9/2014 | Hars et al. | 713/190 |
| 2004/0158742 | A1* | 8/2004 | Srinivasan et al. | 713/201 |
| 2007/0198851 | A1* | 8/2007 | Goto | 713/187 |
| 2008/0098212 | A1* | 4/2008 | Helms | H04L 63/0428 713/155 |
| 2008/0177998 | A1* | 7/2008 | Apsangi | H04L 63/0428 713/155 |
| 2010/0215171 | A1* | 8/2010 | Chan et al. | 380/2 |
| 2011/0145562 | A1* | 6/2011 | Mangalore | 713/151 |
| 2011/0166960 | A1* | 7/2011 | Kim | 705/26.25 |
| 2012/0089839 | A1* | 4/2012 | Qiu et al. | 713/171 |
| 2012/0232970 | A1* | 9/2012 | Kara | 705/14.4 |
| 2013/0002965 | A1 | 1/2013 | Chan et al. | |
| 2014/0068246 | A1* | 3/2014 | Hartley et al. | 713/155 |

* cited by examiner

*Primary Examiner* — Dede Zecher
*Assistant Examiner* — Abdullah Almamun
(74) *Attorney, Agent, or Firm* — McDermott Will & Emery LLP

(57) ABSTRACT

A secure element operating in conjunction with a secure partition of a system-on-a-chip (SoC) having set top box (STB) functionality allows for digital rights management (DRM) key handling in a mobile platform. The secure element can include a secure processing system (SPS) to be implemented as a hard macro, thereby isolating the SPS from a peripheral processing system (PPS). The secure element and the secure partition of the SoC may be operatively connected by a secure cryptographic channel.

20 Claims, 8 Drawing Sheets

MOBILE PAYTV DRM ARCHITECTURE

TECHNICAL FIELD

The technical field of the present disclosure relates to mobile TV and digital rights management (DRM), and in particular, to utilizing embedded secure elements (eSEs) in a mobile device/platform for key handling.

BACKGROUND

Set top boxes (STBs) may be used to receive and decode digital television or cable broadcasts. More recent STBs may also have the ability to interface with data networks, thereby allowing a user to interact with, e.g., the Internet, via a television instead of through a computer. A variety of different types of STBs can exist, including those that merely receive and unscramble encoded television or cable signals to those that can act as a multimedia gateway for receiving multimedia content, to those that can function, for all intents and purposes, as a multimedia desktop computer that can execute various advanced services, e.g., videoconferencing, home networking, IP telephony, video-on-demand, etc.

Digital rights management (DRM) can refer to various access control technologies that can be implemented in STBs or other devices that render digital content. In particular, DRM technology can be used to allow service and/or content providers to provide digital content securely, where DRM-protected content may be encrypted and packaged with a license to enforce authorized consumption of the DRM-protected content. Examples of such DRM technology can include, but are not limited to the following: Apple's iTunes® technology; Windows Media® DRM; Open Mobile Alliance (OMA) DRM; Digital Transmission Licensing Authority Digital Transmission Content Protection (DTCP); and Digital Video Broadcasting Content Protection and Copy Management (DVB-CPCM).

Mobile TV can refer to providing TV services to mobile devices, such as cell phones, handheld mobile computers (e.g., personal digital assistants (PDAs), smartphones, tablet computers), music players (e.g., MP3 players) over mobile telecommunications networks. Mobile TV enables users to access TV related content on their mobile devices. Video, audio, and interactive content may be provided by mobile TV broadcasts. Many broadcasters already provide mobile TV broadcasts, and the numbers of such broadcasts in the marketplace are steadily increasing, where mobile TV signals from broadcasters can be broadcast according to numerous mobile TV standards. Example mobile TV standards include, but are not limited to digital video broadcasting-handheld (DVB-H), digital multimedia broadcasting (DMB), TDtv, 1seg, DAB, and MediaFLO. Mobile TV can include pay TV services and/or content, which can refer to subscription-based or paid-for TV services and/or content, which can be provided by, e.g., analog cable, digital cable, satellite technologies via digital terrestrial and Internet TV. Such pay TV services and/or content may be protected utilizing DRM technology

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1A:
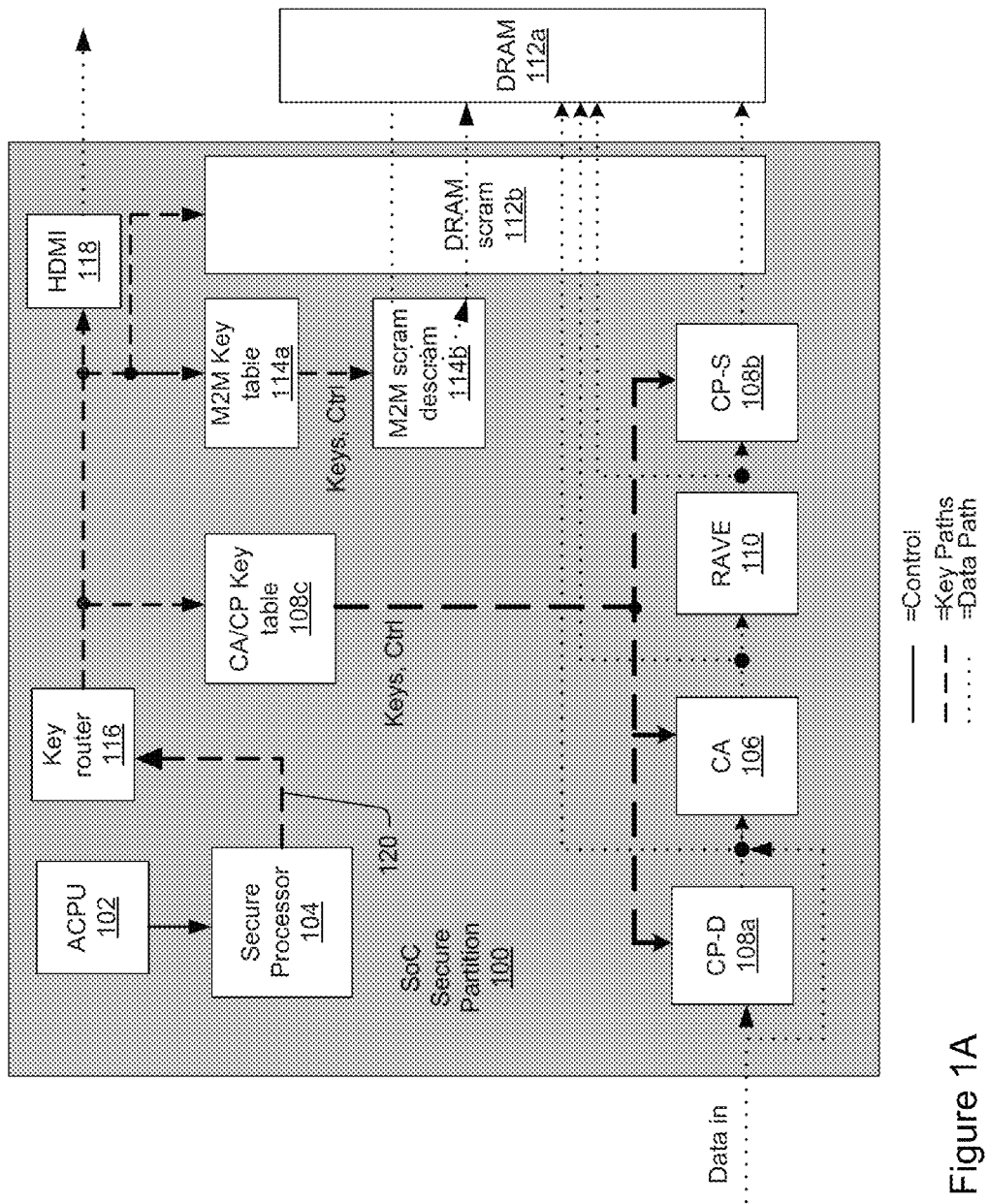
FIG. 1A illustrates an example architecture of a secure partition of a system-on-chip (SoC) for use within an STB.

Attempts to accommodate relatively untrusted software applications or frameworks in certain types of devices may complicate applicable certification processes that are performed in accordance with one or more industry defined certification standards or testing procedures. For example, vendor certification of many STBs used by cable operators is conducted via rigid certification processes that test interoperability and security compliance for devices that implement specifications such as DOCSIS®, PacketCable™, CableHome™, and OpenCable™ Successful certification of such devices typically requires full end-to-end security. Likewise, DRM and other technologies implemented in a particular device or component (such as an SoC) may require distinct certification processes which do not allow certain interactions with an unsecured operating system (OS) environment or software framework. When implemented in a cable STB, cable modem, media terminal adapter or like cable service device, certain specifications may require that a digital certificate be embedded in the device at the time of manufacture. Such certificates underpin a number of security features including device authentication and content integrity. By way of example, a digital certificate embedded in such devices helps prevent pirating of services by allowing a content provider or service operator to authenticate a device requesting services.

In general, any unsecured portions of a media pathway in an STB or like device, if not isolated, will cause the certification of such pathway to fail. Most conventional STBs are designed to provide a single secure and certified pathway through the various elements or components of the device. In some recent multi-processor STBs, a conventional certified pathway is separated from untrusted components by creating a hardware boundary between the two. In particular, a first processing module is utilized to provide secure functionality (e.g., decoding operations), while a separate processing module with a lower security level is used to support an untrusted framework.

A software framework may provide application programming interface (API) functionality and services that are not offered by an underlying operating system, and may thereby offer a level of platform independence in certain implementations. Frameworks are often designed to be a reusable and adaptable software system or subsystem.

The processing unit of some devices may have multiple processors or processing cores in order to provide higher performance and/or multi-tasking capabilities. In some of these multi-processor systems, when multiple applications or programs are running, access control is typically needed to separate the functionality of the applications running on multiple processors. Separation or segregation of different applications and/or tasks running on different processors helps to ensure that one application does not interfere with the execution of another. Likewise data assigned to one processor should not be accessed by another processor, unless that data is shared between the two processors. Such separation may involve controlling the bus accesses each application may make to the rest of the system. Even in a multi-processor system in which one processor environment provides trusted or secure operations while another operates in an unsecure or restricted environment, there can be a substantial possibility of an incursion from the unsecure zone into the secure zone when the operating system is managing the separation.

For example, in an STB that allows a user to receive television signals and also allows the user to access the Internet, the secure environment may run applications (including a secure STB application) pertaining to the reception, decryption and display of certain channels or content provided by a cable or satellite provider or other service operator. The unsecure environment in the STB may execute applications that allow a user to access the Internet for web browsing, gaming, etc. In this example, a content provider would generally not want the user or anyone else to access the applications pertaining to television channels. However, if there is commonality in software that controls the accesses to both environments, such as running the same operating system to manage accesses in both environments, then there may be a heightened risk of access violations. Such violations, whether intentional or non-intentional, could result in an unsecure breach into the secure applications of the STB, such as a web-originated intrusion into protected television channels.

Further, certain of the illustrations herein describe a processing module, a processor or a CPU for a device that provides a processing function in the described embodiments. However, it is appreciated that a variety of other devices and/or nomenclature may be used in other embodiments to provide for the processing function in practicing the invention. Various embodiments may be readily adapted to other usages where multiple processing environments (zones, domains, etc.) exist, in which separation and/or segregation between two or more zones may be desired. Likewise, while certain embodiments are described as implemented by an STB, mobile device, or some similar media processing device performing trusted media processing operations, the architectures and methodologies described herein may be applicable in whole or in part to other devices, including media consumption devices such as PVR's, DVD players, access points, televisions, computing devices, etc. In the context of pay TV services, conditional access (CA) can refer to a service that allows certain content, e.g., broadcasts, programming products, etc., to be restricted through encryption. In order to view such content, the content may be decrypted prior to being decoded for viewing.

FIG. 1A illustrates an example architecture of a secure partition 100 of an SoC (which may be a single semiconductor chip) for use within an STB, where one or more elements and/or applications of the secure partition 100 can be controlled by an on-chip application processor, e.g., ACPU 102, as will be described in greater detail below, and from which secure commands may transmitted to a secure processor, e.g., secure processor 104. The SoC may receive input data, such as a broadcast signal. The secure processor 104 may be utilized to, e.g., screen data transfers, as well as restrict access to the secure partition 100 of the SoC. Furthermore, the secure processor 104 may support one or more multimedia applications that provide security for programming information. Such applications can include CA applications implemented by a CA module 106, copy-protection (CP) applications implemented by CP-descrambling (CP-D), CP-scrambling (CP-S) modules, and CA/CP key table 108a, 108b, and 108c, respectively and/or other DRM mechanisms. Further still, the secure processor 104 may include security components that are required in satellite and cable STBs and various CA and CP standards, such as CP for CableCard and Secure Video Processor (SVP). The secure processor 104 may also support implementations of a variety of security algorithms, whether open or proprietary.

Additionally, the secure partition 100 of the SoC may include a record, audio, video interface engine (RAVE) module 110, which may be utilized to read compressed audio and video from memory, e.g., dynamic random access memory (DRAM) 112a. The RAVE module 110 may, e.g., descramble the compressed audio and video using memory-to-memory (M2M) security and implemented via DRAM scrambling module 112b, M2M key table 114a, and M2M scrambling/descrambling module 114b for decompression and display of the compressed audio and video. M2M may refer to performing cryptographic functions for, e.g., the input data, or other data transmitted within the secure partition 100 of the SoC by reading from memory (e.g., DRAM 112a) and writing to memory (e.g., DRAM 112a) after performing the cryptograph functions (e.g., scrambling and descrambling keys as will be discussed in greater detail below associated with one or more DRM schemes. Such keys may be received via a key router 116.

Media, e.g., video, processing may also occur on the secure partition 100 of the SoC. That is, a signal such as the aforementioned broadcast signal may flow as, e.g., compressed digital data or digitized baseband analog video, for example, and decodable streams based on the signal may be generated by the RAVE module 110. The decodable streams may be stored in memory, such as the DRAM 112a by the RAVE module 110. The decodable streams may be retrieved from DRAM 112a, decoded, and restored in DRAM 112a by a video decoder. A display module may then operate on the decoded streams, and, e.g., scaling and frame composition may be effectuated, additional graphics and/or video may be combined with the signal video, and the resulting stream may be sent to one or more video encoders for display through suitable output interfaces, such as, e.g., a High Definition Multimedia Interface (HDMI) interface 118.

It should be noted that the secure partition 100 of the SoC/semiconductor chip may include more or less elements and/or modules that can include suitable logic, circuitry, interfaces, and/or code that may be operable to process one or more types of data and/or control and/or manage operations, tasks, and/or applications of the secure partition 100 of the SoC.

Figure 1B:
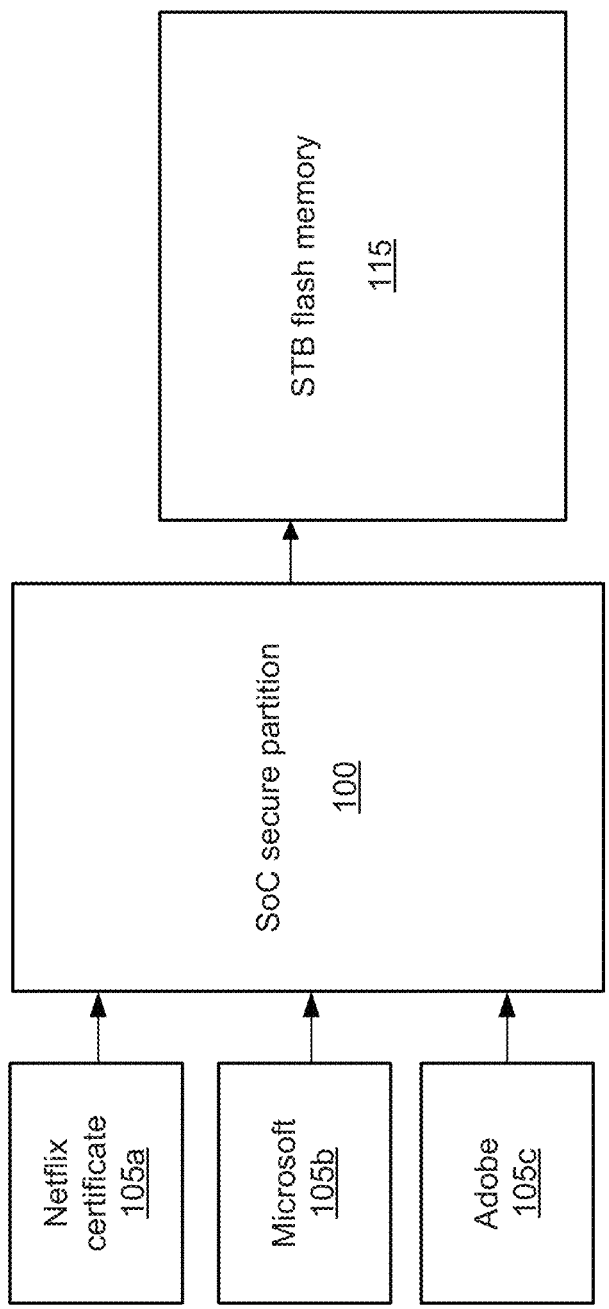
FIG. 1B-1D illustrate example DRM preparation and data flow in an STB.

FIG. 1B illustrates an example of DRM secret/private key delivery to an STB. DRM secrets/private keys, e.g., Netflix certificate 105a, Microsoft® DRM secret 105b (e.g., Windows Media® DRM secret), and Adobe® DRM secret 105c, can be pre-prepared offline, and delivered to an STB in an STB manufacturer production line. As described above, the STB may employ an SoC, where a secure partition 100 of the SoC can encrypt each of the DRM secrets/private keys with a global unique secret key associated with the SoC. A host processor (e.g., ACPU 102) can write the DRM secrets/private keys encrypted with the SoC global unique secret key to flash memory 115 of the STB/mobile device/host device. The SoC global unique secret key may be referred to as $K_{SoCGlobal}$, and the encrypted DRM secrets/private keys may be referred to as $K_{SoCGlobal}$(DRM Private Keys).

Figure 1C:
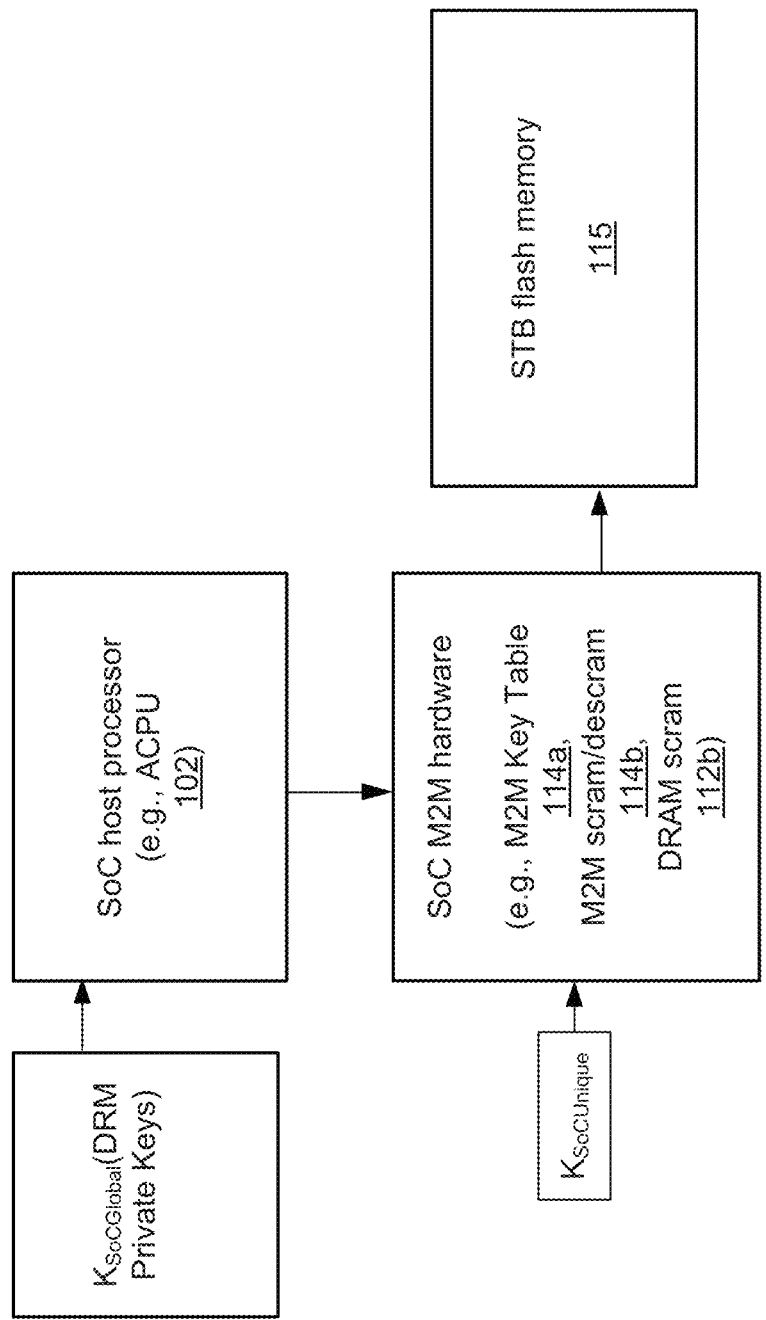

FIG. 1C illustrates an over encryption process, where the globally encrypted DRM secrets/private keys, $K_{SoCGlobal}$ (DRM Private Keys), may be over encrypted with a unique key associated with the SoC to prevent the globally encrypted DRM secrets/private keys version, $K_{SoCGlobal}$(DRM Private Keys), stored in memory from being copied to another STB. That is, each STB may have the same SoC global unique secret key, so the over encryption process utilizing an SoC unique key, which may be referred to as $K_{SoCUnique}$, may prevent cloning issues. In particular, the SoC host processor, e.g., ACPU 102 of FIG. 1, may forward the globally encrypted DRM secrets/private keys, $K_{SoCGlobal}$(DRM Private Keys) to the SoC M2M hardware, which can include the M2M key table 114a, the M2M scrambling/descrambling module 114b, and the DRAM scrambling module 112b). The SoC M2M hardware may then perform the over encryption process by over encrypting the globally encrypted DRM secrets/private keys, $K_{SoCGlobal}$(DRM Private Keys) with the SoC unique key, $K_{SoCUnique}$, resulting in an over encrypted version which may be referred to as, $K_{SoCUnique}(K_{SoCGlobal}$ (DRM Private Keys)).

Figure 1D:
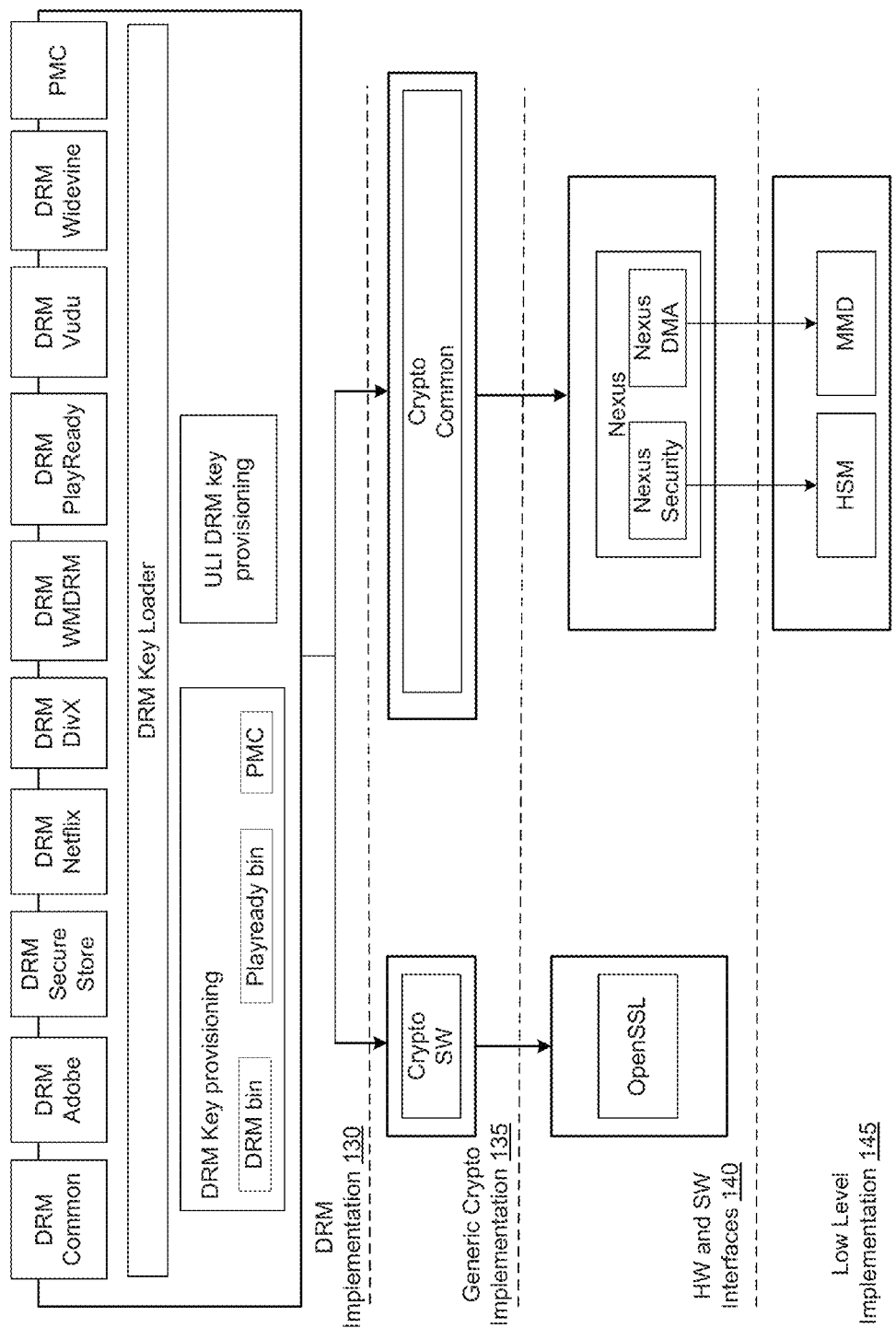

At run time, host software can execute the DRM stack which may request a cryptographic operation using the DRM secrets/private keys stored in over encrypted fashion in flash memory. FIG. 1D illustrates an example DRM stack implemented at the DRM implementation level 130. A common DRM framework illustrated in FIG. 1D may be used to provide an API through which the DRM stack makes the cryptographic operation request. The common DRM framework can have the SoC security hardware (the secure partition 100 of the SoC) first decrypt a DRM package using the SoC unique key, $K_{SoCUnique}$, and subsequently use the SoC global unique secret, $K_{SoCGlobal}$ to decrypt the DRM package. Both decryption operations may be performed by the security hardware such that the SoC global and unique secret keys are not known and cannot be accessed by the host processor. As a result, a clear and unencrypted DRM certificate (e.g., Netflix certificate 105a of FIG. 1B) can appear in memory, and the common DRM framework software running on the host processor will then either pass the secret/private key to the security hardware via a common cryptographic library implemented in the generic cryptographic implementation level 135, nexus and low level drivers implemented in the hardware (and software) interface and low level implementation levels 140 and 145, respectively.

It should be noted that if necessary hardware is not present (e.g., cryptographic accelerator), the common DRM framework may pass the secret/private key to a software cryptographic library such as openSSL (implemented at the hardware and software interfaces level 140), via cryptographic software library implemented in the generic cryptographic implementation level 135. The aforementioned common DRM framework can provide all the required cryptography, and a common API and robust key management, while allowing the underlying hardware to differ.

It should also be noted that the DRM stack and common DRM framework may all run on the host processor, and rely on software isolation and security to ensure correct, robust operation (as will be described in greater detail below). The decrypted DRM secrets/private keys can be available to the host processor, while the SoC global and unique secret keys are not.

As described above, many broadcasters already provide mobile TV broadcasts, and the numbers of such broadcasts in the marketplace are steadily increasing. Accordingly, the amount and popularity of mobile pay TV broadcast content is also steadily increasing. While conventional methods of providing mobile pay TV services may seek to secure a trusted execution engine aspect of a mobile device, i.e., by combining the key handling and media (e.g., video processing) to be handled by the same processor, reaching the same level of security typically found on an STB would be cost prohibitive.

Moreover, and following the example architecture of FIG. 1A, conventional methods would rely on the integration of a secure processor into a mobile processor of the mobile device, again adding additional cost to, e.g., the manufacturing of the mobile processor.

Still other conventional methods may rely on the utilization of subscriber identity module (SIM) cards. However, SIM cards are generally controlled by mobile network operators or wireless carriers, each of which may rely on complex and differing business models and fragmentation, making SIM card-based implementations of an SE for mobile pay TV (as well as the issuing and execution of mobile payment applications for mobile pay TV services/content) difficult to realize.

In accordance with various embodiments, an SE, such as an eSE, may be utilized in a mobile environment, such as a mobile device, e.g., a smartphone, tablet computer, or other host device. The eSE may perform the aforementioned security functions, that on an STB (as described above), may be performed by a security processor, such as the secure processor 104 of FIG. 1A.

Figure 2:
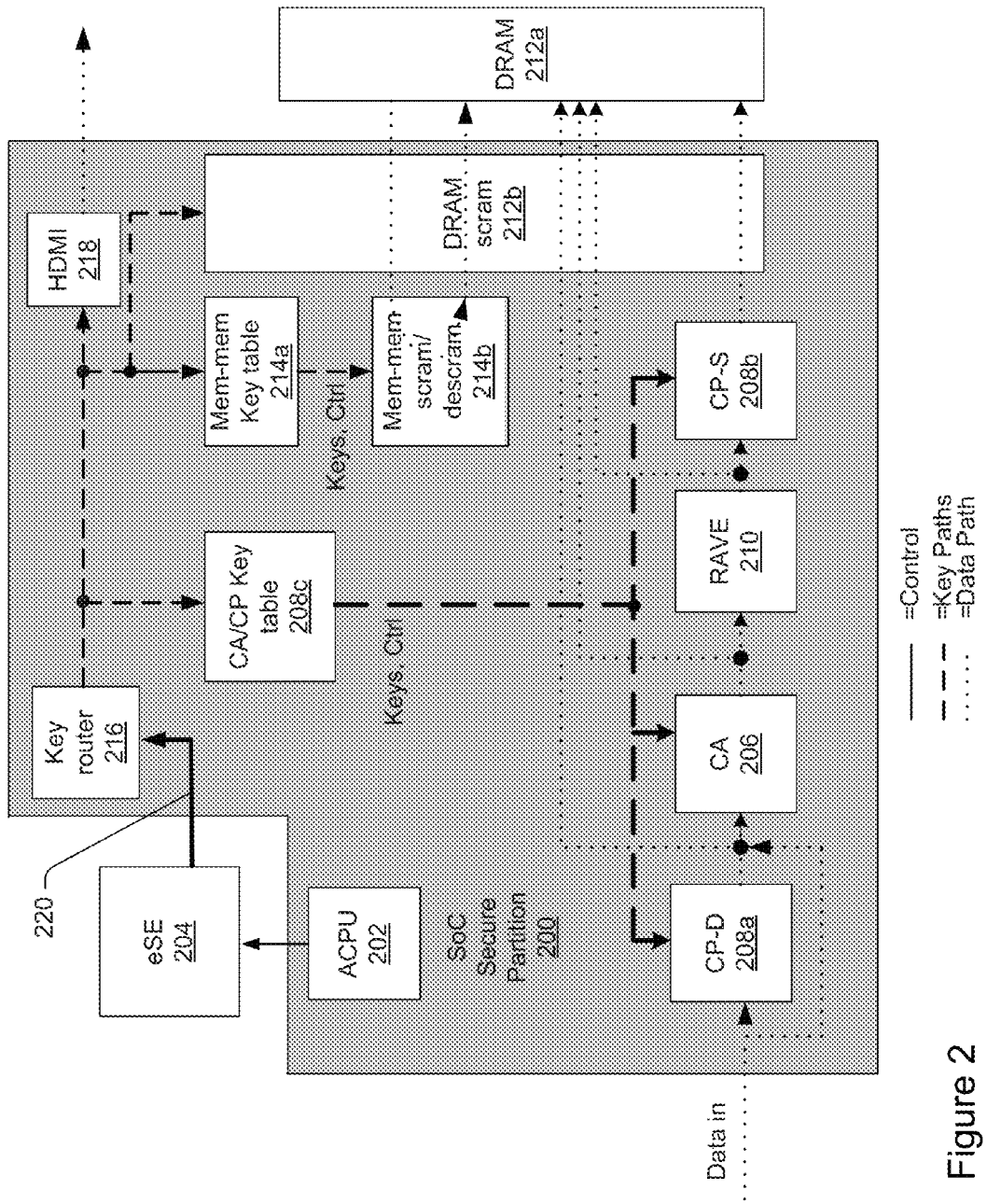
FIG. 2 illustrates an example architecture of an eSE for use within a host device.

As illustrated in FIG. 2, such an eSE, e.g., eSE 204, may perform the key handling for DRM schemes. Video processing may be performed in the secure partition 200 of an SoC (for implementing mobile STB functionality, and which may also be considered a trusted execution engine) of the mobile device. FIG. 2 further illustrates ACPU 202, which as described above, may transmit secure commands to the eSE 204. The SoC of FIG. 2, like that of FIG. 1A may receive input data, such as a broadcast signal. The eSE 204 may be perform screen data transfers, as well as restrict access to the secure partition 200 of the SoC, and may support one or more multimedia applications that provide security for programming information. Again, and similar to those applications described above with reference to FIG. 1A, such applications can include CA applications implemented by a CA module 206, CP applications implemented by CP-D, CP-S modules, and CA/CP key table 208a, 208b, and 208c, respectively and/or other DRM mechanisms. Further still, eSE 204 may include security components that are required in satellite and cable STBs and various CA and CP standards, such as CP for CableCard and SVP, and can also support implementations of a variety of open and/or proprietary security algorithms.

The secure partition 200 of the SoC may include a RAVE module 210, which may be utilized to read compressed audio and video from DRAM 212a. The RAVE module 210 may, e.g., descramble the compressed audio and video using M2M security and implemented via DRAM scrambling module 212b, M2M key table 214a, and M2M scrambling/descrambling module 214b for decompression and display of the compressed audio and video. Keys utilized in the performance of cryptograph functions (e.g., scrambling and descrambling keys) associated with one or more DRM schemes may be received via a key router 216.

Media, e.g., video, processing may occur on the secure partition 200 of the SoC, where, e.g., a broadcast signal, may flow as compressed digital data or digitized baseband analog video, for example, and decodable streams based on the signal may be generated by the RAVE module 210. The decodable streams may be stored in memory, such as the DRAM 212a by the RAVE module 210, retrieved from DRAM 212a, decoded, and restored in DRAM 212a by a video decoder. A display module may then operate on the decoded streams, and, e.g., scaling and frame composition may be effectuated, additional graphics and/or video may be combined with the signal video, and the resulting stream may be sent to one or more video encoders for display through suitable output interfaces, such as, e.g., a High Definition Multimedia Interface (HDMI) interface 218.

Also illustrated in FIG. 2, is a secure cryptographic channel 220 that operatively connects the eSE 204 and the "cryptographic core" of the secure partition 200 by way of the key router 216. While in FIG. 1A, an on-chip direct hardware connection 120 may be provided that cannot be "seen" by the video processing aspect of the secure partition 100 of the SoC, the cryptographic channel 220 is similarly "hidden" by encoding a unique identifier in the secure partition 200 cryptographic core that may be bound to the eSE 204. This may be accomplished during, e.g., manufacturing of the mobile device, via, for example, symmetric or certificate-based binding.

It should be noted that the secure partition 200 of the SoC/semiconductor chip may include more or less elements and/or modules that can include suitable logic, circuitry, interfaces, and/or code that may be operable to process one or more types of data and/or control and/or manage operations, tasks, and/or applications of the secure partition 200 of the SoC.

In accordance with various embodiments, utilization of an eSE, such as the eSE 204, has the advantage of being an integral part of any mobile device, and because it is controlled by mobile device original equipment manufacturers (OEMs), various applications/implementations may be provided that can be carrier-agnostic. According to one aspect, the eSE may utilize a secure processing system hard macro. As utilized herein, the term "hard macro" may refer to the design of a logic function on an integrated circuit (IC) chip that may specify how required logic elements are interconnected, as well as the physical pathways and/or wiring patterns between components. In particular, an secure processing system (SPS) in accordance with various embodiments may be a die isolated hard macro that can be instantiated in, e.g., an application-specific IC (ASIC). This may be contrasted with a soft macro, where the physical pathways and/or wiring patterns are not specified. The SPS in accordance with various embodiments may, through an isolation bridge protected by the SPS, utilize generic interfaces to access and/or otherwise interact with such unsecure/peripheral logic and/or circuitry, which may make up or embody a peripheral processing system (PPS). That is, an eSE configured in accordance with various embodiments may be partitioned into a first portion that may include a hard macro SPS, and a second portion that may include a PPS, where the hard macro SPS may be "self-sufficient" within the boundary of the hard macro and isolated from the PPS. In accordance with various embodiments, the PPS may refer to a processing system utilized to relay communication on physical transport interfaces (as will be described in greater detail below) to the isolation bridge. Accordingly as well, the hard macro SPS in accordance with various embodiments may be "transport-agnostic."

In accordance with various embodiments, and as a result of utilizing a hard macro SPS, the hard macro SPS may be certified (and/or meet security requirements for, e.g., DRM) and used/re-used in one or more devices without the need to re-certify those one or more devices in their entirety. That is, and for example, a common security requirement may be that only certified (or trusted) code be executed in the security domain of a system (e.g., an SPS). In certain approaches to meeting this security requirement, systems may implement an architecture where a hardware mechanism is used to allow a single processor to operate logically as two processors. However, from a security perspective, this architecture may require preventing the SPS from operating simultaneously with an application processor.

Furthermore, and in the context of multi-application environments, secure (certified) applications (such as a certified financial application) may co-exist with customer-written applets. Thus, certification of a device in which such multi-application environments exist may become invalid once the customer-written (untrusted) applet is added to the multi-application environment. Therefore, utilization of a hard macro SPS in accordance with various embodiments may avoid the need to, e.g., re-certify an entire device upon an untrusted applet being added to the multi-application environment.

Additionally, any updates to interface drivers and/or system interfaces, for example, need not affect the certification of the hard macro SPS, nor would they pose any type of security risk. For example, certification of a device utilizing a conventional SPS, may entail certification of the entire device including any interfaces, such as one or more peripheral interfaces, when the device may be a small IC chip. Because any differences in such (small IC chip) devices may simply involve differences in flash memory, electrically erasable programmable read only memory (EEPROM), and/or software running on a platform of the devices, including these aspects of the devices as part of a TOE for certification may be thought of as being straightforward. Although re-certifying each of the devices may be both a costly and lengthy process, where any new security threats may also require evaluation, in the context of, e.g., generational changes to smart card devices, re-certification of entire devices may not pose issues. However, and in the context of combination/multi-mode devices, such as communication devices that enable some combination of wireless local area network (WLAN), Bluetooth®, Global Navigation Satellite System (GNSS), e.g., Global Positioning System (GPS), and cellular communications utilizing, e.g., Generation Partnership Project (3GPP) Long Term Evolution (LTE) communications standard, a fourth generation (4G) mobile communications standard, or a third generation (3G) mobile communications standard, for example, re-certification may be unfeasible or at least, difficult to achieve.

Various embodiments described herein are presented in the context of an eSE designed for use in a host device, such as a mobile device, in combination one or more connectivity controller(s). The connectivity controller(s) may be included in/implemented as a connectivity device/chip. Such connectivity devices/chips may provide, e.g., NFC capabilities, Bluetooth® communication, Wi-Fi™ communication, etc., or any combination thereof. Various embodiments may also provide security applications that may be specific to a host device that may not necessarily utilize, e.g., NFC.

The eSE design may utilize external flash memory to provide near unlimited secure application storage within a mobile device. Non-volatile data may be stored in either host processor flash memory or local serial peripheral interface (SPI) flash memory, where the local SPI flash memory may be used for applications that are to be available when a host, e.g., the mobile handset, is not powered on. One example of such an application may be a field power application. Additionally, the local SPI flash memory may be utilized for the storage of static information outside of the target of evaluation (TOE) in external non-volatile memory.

The external flash memory may always be protected by unique keys stored in the eSE to ensure that the security of the applications and data is maintained at the same level as on-chip information. The external flash memory may be managed by the eSE firmware and host device software to ensure a seamless integration with host device-based applications. By providing flash memory externally, the eSE provides flexible options that can accommodate secure application storage, as well as the potential for future integration in other host devices.

Designing the SPS of an eSE in accordance with various embodiments may entail completely designing the SPS in a secure facility as a hard macro. For example, once a final chip level design for an SPS as a hard macro is achieved, that final chip level design may be imported into a secure facility. The hard macro SPS may be merged with other components of the eSE, e.g., the PPS. Design Rule Checking (DRC) may be performed on the eSE, and upon DRC validation (with requisite Design Rules), the eSE may be taped out from the secure facility onto a certified chip (e.g., IC) fabrication line/facility for manufacture.

The eSE may utilize a variety of system interfaces to provide external connectivity. A first interface may be that which connects the eSE to an NFC or connectivity controller, which provides an interface for secure applications to communicate using a radio interface. For example, the host device (utilizing an eSE in accordance with various embodiments) and an NFC-enabled device may interact via a secure application(s) using NFC. A second interface may connect the eSE with the host device processor. The eSE may connect (either physically or logically) to the host device processor for management, such as, e.g., loading and unloading applications, as well as for interacting with host-specific security applications. A third interface may be relied upon to allow the eSE to access flash storage, where again, the eSE may connect, either physically or logically, to external flash memory to effectuate application code and data storage. It should be noted that other system interfaces may be utilized by the eSE for external connectivity purposes.

Figure 3:
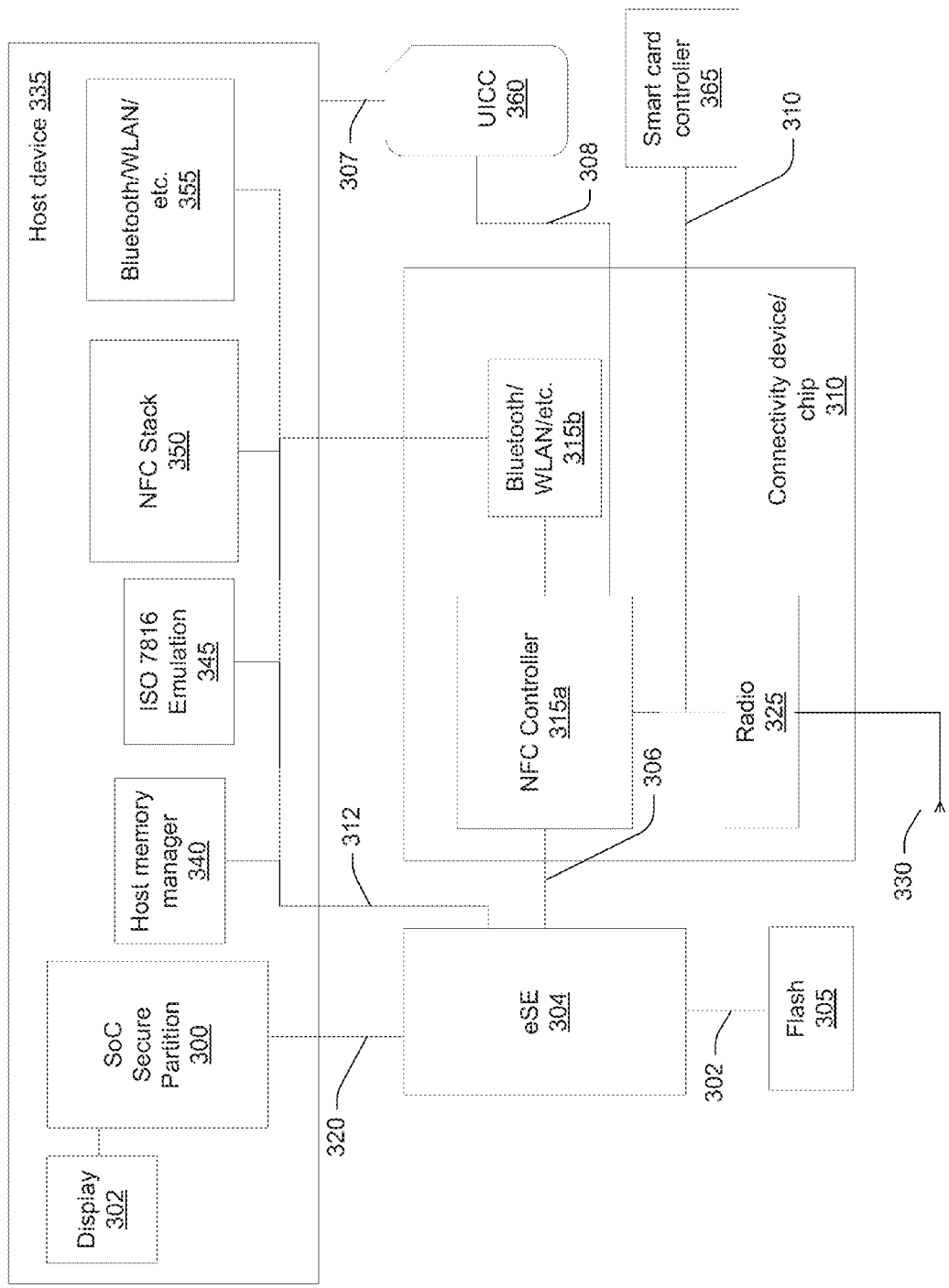
FIG. 3 illustrates an example connection diagram representative of an embedded secure element operating in conjunction with a host device.

FIG. 3 illustrates an example connection diagram representative of an eSE 304 operating in conjunction with a connectivity device/chip 310 and a host device 335, where the host device 335 may be, e.g., a mobile device, and the connectivity device/chip 310 may provide multi-band connectivity for the host device 335.

As previously described, the eSE 304 may utilize external flash memory, e.g., Universal Integrated Circuit Card (UICC) 360 to store secure applications and/or secure information, and local flash memory, e.g., local flash memory 305 for storing non-volatile data. The eSE 304 may connect to the local flash memory 305 via an SPI interface 302, and may connect to the UICC 360 via a single wire protocol (SWP) or dual wire protocol (DWP) interface 306 to an NFC controller 315*a*, and from the NFC controller 315*a* to the UICC 360 using an SWP interface 308. The UICC 165 may be connected to the host device 335 via an ISO 7816 interface 307.

Communications on an SWP interface, such as the SWP interface 306 may be asynchronous to an SPS clock which will be described in greater detail below, may not leak clock data, and may operate up to 1.7 Mbps. A DWP interface may be considered to be the same as a SWP interface at the protocol layer, where digital receive and transmit lines are used to bypass the SWP PHY providing a lower power yet higher performance interface. A DWP interface may operates at speeds of up to 6.8 Mbps, where an unused pin for the DWP interface can be used as a general purpose input/output (GPIO) pin when an SWP interface is used.

Again, the eSE 304 may utilize external non-volatile/flash memory for storing secure applications and information/data. The eSE 304 can be configured to use either host flash memory, local flash memory, or both. The local flash memory may be utilized for situations where the host device 335 is not available (such as the aforementioned field power mode). In one example, local flash memory 305 may be used for storing field (or low power) mode applications and data, e.g., mainly for NFC applications. A host processor/device connection may be used to provide an option to download secure applications and data paged into the eSE 304 from a host device processor. It should be noted that the various flash memory may be protected using keys that are unique to each individual eSE, such as eSE 304, where a secure state is encrypted, authenticated and replay protected by the eSE.

The connectivity device/chip 310 may include the aforementioned NFC controller 315*a* to which the eSE 304 connects via the SWP/DWP interface 306. In turn, the NFC controller 315*a* may be connected to a radio 325 and an antenna 330 to effectuate NFC (or other radio communication connectivity). Additional elements in the connectivity device/chip 310 may include other connectivity controllers, such as connectivity controller 315*b* which may provide Bluetooth® connectivity, WLAN (e.g., Wi-Fi™) connectivity, etc. The NFC controller 315*a*, the connectivity controller 315*b*, and the radio 325 may communicate via one or more communications interfaces that may be, e.g., wired or wireless, and the interconnections therebetween may form, e.g., parallel or serial interfaces to carry such communications. It should be noted that for ease of reference, other elements of the connectivity device/chip 310 have been omitted, and that more or less elements in the connectivity device/chip 310 may be implemented without departing from the spirit or the scope of the present disclosure.

Specifically with regard to the SWP/DWP interface 306 between the eSE 304 and the NFC controller 315*a*, all communications may occur thereon, and EEPROM emulation may be supported in this SWP/DWP mode, where the eSE 304 may provide EEPROM emulation for the NFC controller 315*a* via the SWP/DWP interface 306. The EEPROM emulation may provide up to 8 Kbytes of data read from the local flash memory 305. In an SWP/DWP+Host mode, all host communications may occur on a host device interface, while all radio communication may occur on the SWP/DWP interface. It should be noted that a DWP interface works in the same manner as an SWP interface, using digital signaling at the PHY layer to reduce power and increase performance, as previously described.

Also connected to the connectivity device/chip 310 may be a smart card controller 365, such as a SmartMX™ contact interface controller, an SLE 97 Solid Flash™ smart card microcontroller, etc., via a digital contact less bridge (DCLB) interface/NFC-wired interface (NFC-WI) 310. A DCLB interface may refer to an interface for providing a connection between an eSE and an NFC modem, and an NFC WI interface may refer to a NFC wired interface having 2 signal wires (signal-in and signal-out) for providing a connection between an eSE and an RF interface of an NFC interface. The smart card controller 365 may be utilized to control the UICC 360.

The eSE 304 may provide a plurality of possible physical host device connection options for interfacing with the host device 335. While a physical host device connection may not be required since the eSE 304 can communicate with the host device 335 through the NFC controller 315*a* or the connectivity controller 315*b*, it may be preferable, in cases where non-NFC security applications are supported, to utilize a physical host connection. The possible host device interfaces 312 that are supported to effectuate such a physical host device connection may include, but are not limited to the following: a universal asynchronous receiver transmitter (UART) interface, in particular, a four wire flow controlled UART capable of speeds up to 6 mbps; an SPI interface, in particular, an SPI slave mode with up to 33 mbps throughput; and an inter-IC (I2C) interface, in particular, a two wire I2C slave connection dedicated for communication with the host device 335 with a throughput of up to 3.4 Mbps. It should be noted that other physical host device connections may be utilized, e.g., a universal serial bus (USB) connection.

A UART interface 355 may utilize the following I/O signals: RX; TX; RTS; and CTS. The UART interface 355 may have adjustable baud rates from 9600 bps to 4.0 Mbps, and may have an automatic baud rate detection capability that returns a baud rate selection. Alternatively, the baud rate may be selected through a vendor-specific UART HCI command. The vendor-specific UART HCI command may be issued during normal UART HCI operation. A default baud rate may be 115.2 kbps, and the eSE 300 side UART interface (not shown) may operate correctly with the host device 335 side UART interface 355 as long as the combined baud rate error of the eSE 304 and the host device 335 is within +/−2%. The UART interface 355 may run on a fixed reference clock, typically 24 MHz, but other reference clock frequencies may be possible.

It should be noted that the UART interface 355 may support various Bluetooth® HCI protocols, as does the eSE 304, since baseband hosts that communicate with both Bluetooth® and SE devices over UART may wish to use common drivers. Additionally, the UART interface 355 can perform XON/XOFF flow control and includes hardware support for the Serial line Input Protocol (SLIP), and can also perform wake-on-activity.

The UART interface 355, when chosen from the possible host device interfaces 312, can be configured to mimic an ISO 7816 interface for the purposes of re-using existing test equipment, where the three signals utilized by an ISO 7816 interface, e.g., CLK, RST, IO, may be configured as inputs to a UART device, in this case, the eSE 304 and/or the host device 335. The CLK input signal may be used to over-ride a baud clock in the recovery circuit of the eSE 304, the RST line may be routed as a interrupt to a processor (e.g., Cortex-MO) utilized in the PPS 220, and the I/O line may be configured to use a transmit signal as a driver of a data line. It should be noted that because the UART interface 355 is mimicking an ISO 7816 interface, it is not required to be a compliant ISO 7816 interface, and a default baud rate may be used on both sides of the UART interface to avoid CLK modifications. An external resistor may be used to pull up the signal on the IO line for ISO 7816 communications, and the eSE 304 programmable drive strength may be controlled from the processor of the PPS.

It should be noted that the possible host device interfaces 312 (e.g., UART, SPI and I2C interfaces) may use shared pins that are multiplexed to the host device 335, allowing one of the possible interfaces device 312 to be used at a time. If the host processor/device connection is effectuated via an I2C interface, then the remaining interface pins can be used as GPIO. Selection of one of the possible host device interfaces 312 may be determined based on interface sensing in the eSE 304 when a one time programmable (OTP) memory to be discussed in greater detail below, has not yet been programmed. Alternatively, the OTP memory may be programmed during manufacturing to select a specific host interface of the possible host device interfaces 312, disabling all others.

It should also be noted that while a direct connection may be implemented between the eSE 304 and the NFC controller 315a and/or connectivity controller 315b, both the host device interface (e.g., one of the possible host device interfaces 312) and the SPI interface 302 can be emulated logically through the NFC controller 315a to the host device 335. The eSE 304 may be designed with the assumption that there may always be at least, e.g., 512 Kbytes of local flash memory (e.g., local flash memory 305) storage.

Additionally, the eSE 304 may be connected to secure partition 300 of an SoC for implementing mobile STB functionality via a secure cryptographic channel 320, as previously described, within the host device 335. The secure partition 300 of the SoC may be further connected to a display 302 of the host device 335 for rendering mobile TV content, such as mobile pay TV content subsequent to processing at the secure partition 300 of the SoC, as also previously described. Further still, DRM preparation and data flow in such a mobile context may be implemented in a similar manner as that illustrated in FIGS. 1B-1D.

Figure 4:
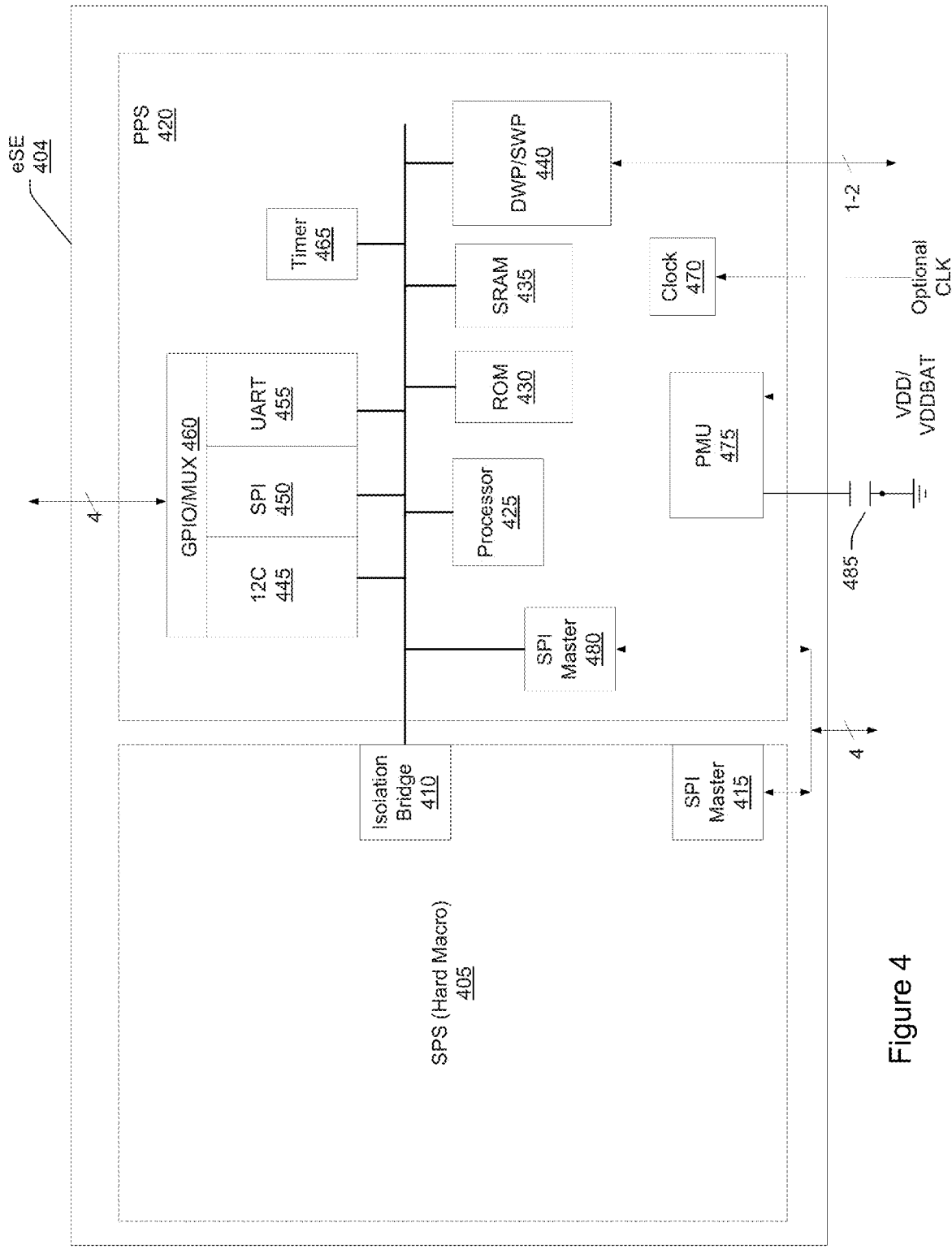
FIG. 4 illustrates an example embedded secure element configuration.

As previously indicated, the eSE 304 may be divided into two portions or sub-systems, i.e., a hard macro SPS and a PPS. FIG. 4 illustrates an eSE 404 that can represent an example embodiment of the eSE 304 of FIG. 3, where eSE 404 may include a hard macro SPS 405 and a PPS 420, where the hard macro SPS 405 is hardware isolated from the PPS 420 which may include non-secure or non-security related elements (e.g., memory and peripherals, such as drivers for the aforementioned host device peripheral interfaces). That is, the PPS 420 operates independently from the hard macro SPS 405, thereby allowing the hard macro SPS 405 to maintain its security certification without a need to include any drivers and/or hardware interfaces in the PPS 420 as security critical. As will be described in greater detail below, an isolation bridge 410 may be the only interface for TOE communication between the OOS 420 and the hard macro SPS 405. Additionally, the PPS 420 may mimic an NFC controller, e.g., the NFC controller 315a of FIG. 3, for the hard macro SPS 405, and the hard macro SPS 405 power modes are slaved to the PPS 420 (as well as the NFC controller).

The PPS 420 may utilize a processor 225 (e.g., a Cortex-MO processor) for execution of interface driver code in a hardware isolated environment, such as the eSE 404. The processor 425 may request secure services from the hard macro SPS 405, and may be responsible for moving data to/from peripheral interfaces from/to an IO shared memory space in static random access memory (SRAM) of the hard macro SPS 405. The processor 425 may have read/write access to an SPI flash memory interface of the hard macro SPS 405 (e.g., SPI master interface 415), via an SPI master interface 480, until it signals the hard macro SPS 405 to exit reset. Once the hard macro SPS 405 is activated, the PPS 420 may lose access to the SPI flash memory interface of the hard macro SPS 405. Furthermore, firmware operating on the processor 425 may ensure that none of the firmware in the hard macro SPS 405 is required to change based on changing external drivers. Accordingly, a separate and isolated patch mechanism for the processor 425 is provided.

A local read only memory (ROM) module 430 may be configured to hold driver code for the processor 425, where the allocated size of this code block may be, e.g., 64 Kbytes. The PPS 420 may contain its own dedicated patch capability for up to, e.g., 16 patches, where patch code may be verified and loaded by the PPS 420 from local flash memory, e.g., the local flash memory 305 of FIG. 3. The PPS 420 may send a request for the hard macro SPS 405 to update the patch locations in the local flash memory 305. The patch code for the PPS 420 may be stored in a section of flash memory dedicated for the PPS 420, where the signature of the patch file is verified by PPS 420 ROM code when the patch is downloaded into the dedicated flash memory for the PPS 420, thereby providing roll back protection with a major and minor revision embedded in the patch file.

The PPS 420 may contain an OTP block (not shown) capable of storing 1 kbits of information. This OTP block may be used for authentication keys, and test debug information for Reliability, Maintainability, and Availability (RMA) analyses.

The PPS 420 may further contain a dedicated 16 Kbyte scratch memory (e.g., SRAM module 435) for the processor 425. The processor 425 may be allowed to execute instructions from this memory, and an isolated I/O buffer (not shown) between the hard macro SPS 405 and the PPS 420 may be used for exchanging commands and data.

In order to communicate between the hard macro SPS 405 and the PPS 420, the hard macro SPS 405 and the PPS 420 may utilize a negotiated portion of I/O memory to create a mailbox between the two systems implemented within the aforementioned isolation bridge 410. The hardware may provide, e.g., 8 signals that can be controlled by the hard macro SPS 405 firmware to indicate status as well as to interrupt the PPS 420, where the processor 425 non-volatile IC can mask these sources based on the protocol utilized between the two systems.

For example, a busy signal can be set by the hard macro SPS 405 while processing a smart card application protocol data unit (APDU) that may be status only (masked). Once a command completes, the hard macro SPS 405 can set a done flag that may cause an interrupt (un-masked) to be taken by the processor 425. The definition of the use of these signals can be determined by the hard macro SPS 405 secure firmware and the processor 425 firmware. Similarly, the hardware can provide, e.g., 8 signals, that can be controlled by the PPS 420 firmware to indicate status as well as to interrupt the hard macro SPS 405 (where interrupts are controlled by the hard macro SPS 405 secure firmware).

In addition to the interrupt and I/O memory communication between the two systems, status information may be maintained by the hard macro SPS 405 that can be read by the PPS 420 from the local flash memory, e.g., the local flash memory 305. The PPS 420 provides interface status information to the hard macro SPS 405 as part of the isolated memory buffer. Moreover, the hard macro SPS 405 system status information (such as power state, host port, NFC port, etc) may be retained through power cycles by using the local flash memory as an extension of the buffer provided for NFC EEPROM emulation (as described above). It should be noted, however, that such state information provided here is system-related and may not contain any security sensitive information.

Further still, the PPS 420 may contain its own dedicated timer 465 referenced from a program scan clock (PSCLK) signal with a resolution of 1 MHz (which may be constant regardless of the PSCLK frequency. Moreover, the PPS 420 and the hard macro SPS 405 may have an 8 Kbyte shared memory buffer for mailbox transactions, which may be byte writeable.

As described previously, an eSE, e.g., eSE 404, may utilize a variety of system interfaces to provide external connectivity. Accordingly, and as described above, the PPS 420 may include a slave SPI controller/interface 450 intended for communications with a host device, such as the host device 335. The physical interface between an SPI master (within the host device 335) and the eSE 404 may consist of four SPI signals (SPI_CSB, SPI_CLK, SPI_SI, and SPI_S) and one interrupt signal (SPI_INT). The eSE 404 may be configured to accept active-low or active high polarity on the SPI_CSB chip select signal, and also can be configured to drive an active-low or active-high SPI_INT interrupt signal. The SPI_INT signal can facilitate packet level flow control. Additionally, the bit ordering on the data lines (SPI_SI and SPI_SO) can be configured to be either little-endian or big-endian. Proprietary sleep mode half-duplex handshaking may be implemented between the SPI master and the eSE 404.

The SPI slave interface 450 may include the following: support for SPI Mode 0 (CPOL=0, CPHA=0), where another mode may be set as a default; support for normal SPI bit ordering (MSB first); operation with a range of reference clocks, e.g., up to 24 MHz; and support for interrupt generation when the host device 335 needs to service the SPI slave interface 450.

SPI hardware may share a first in first out (FIFO), which may refer to a set of read/write pointers, storage (e.g., SRAM), and control logic with UART, where access to the FIFO may be conducted through an advanced high-performance bus (AHB) interface, through either direct memory access (DMA) or a central processing unit (CPU). Various SPI modes may be supported, and the host device 335 may decide which SPI mode to use. Upon deciding which SPI mode to use, the host device 335 may notify the eSE 404 of the selection with a negotiation request message at startup. It should be noted that the size of the FIFO may be adjusted in accordance with desired throughput requirements, but as an example, nine-bit addressing may be supported such that any FIFO size up to, e.g., 512 B may be chosen.

Another SPI master interface 415 may be implemented locally within the hard macro SPS 405, and may be dedicated to accessing the local flash memory 305. The SPI master interface 415 can support dual data I/O for compatibility with various flash memory vendors. The output may be bi-directional to support dual input, and support for OnSemi, Atmel and Macronix dual data IO may also be included. Multiplexing for the local flash memory 305 may be controlled by hardware in the PPS 420 that selects the PPS 420 by default at reset, and then switches (without glitching) to the SPS 405 when the SPS 405 is activated, as described above.

As alluded to above, the possible host device interfaces 312 (e.g., UART, SPI, and I2C) can be configured as GPIO. The signal pins can be controlled as input, output, I/O, open drain. They can support both level and edge sensitive interrupts. Accordingly, these possible host device interfaces 312 may be effectuated via an I2C interface 445, the SPI slave interface 450, and the UART interface 455, configurable and represented by GPIO/MUX 460, within the PPS 420. Furthermore, the aforementioned DWP/SWP connections may be effectuated via DWP/SWP interface 440.

With regard to the clocking structure of the eSE 404, an internal secure clock domain (which will be described in greater detail below) may be completely isolated and asynchronous from all other external clocks, including clock 470, which may be used for the isolated elements within the PPS 420. Clock 470 of the PPS 420 may be generated based on an optional external clock input or an internal low power oscillator (LPO) dedicated to the PPS 420, where the input clock frequency may be automatically sensed by the eSE 404. A host device interface clock (not shown) can be one of the following frequencies: 26 MHz, 13 MHz, 9.6 MHz, 19.2 MHz, 38.4 MHz, 52 MHz or 16 MHz, and can be either a clock input or a crystal circuited local to the eSE 404.

A power management unit (PMU) 475 may provide power for both the PPS 420 and the hard macro SPS 405. In one example, the PMU 475 may be a 1.8 volt supply powered by the NFC controller 315*a*, and used for field power applications when the host device 335 is not available. The supply voltage (voltage drain) VDD/VDDBAT input can range between 5.5 volts down to 2.4 volts, and may be used for all other modes of operation to power the eSE 404. The PMU 475 may provide step up/down conversion for managing external capacitor 485, where the external capacitor 485 may be used to ensure the completion of writes to external flash memory (e.g., UICC 360) for anti-tearing purposes in all modes of operation of the hard macro SPS 405. It should be noted that anti-tearing capabilities may not be provided in hardware for the PPS 420.

Figure 5:
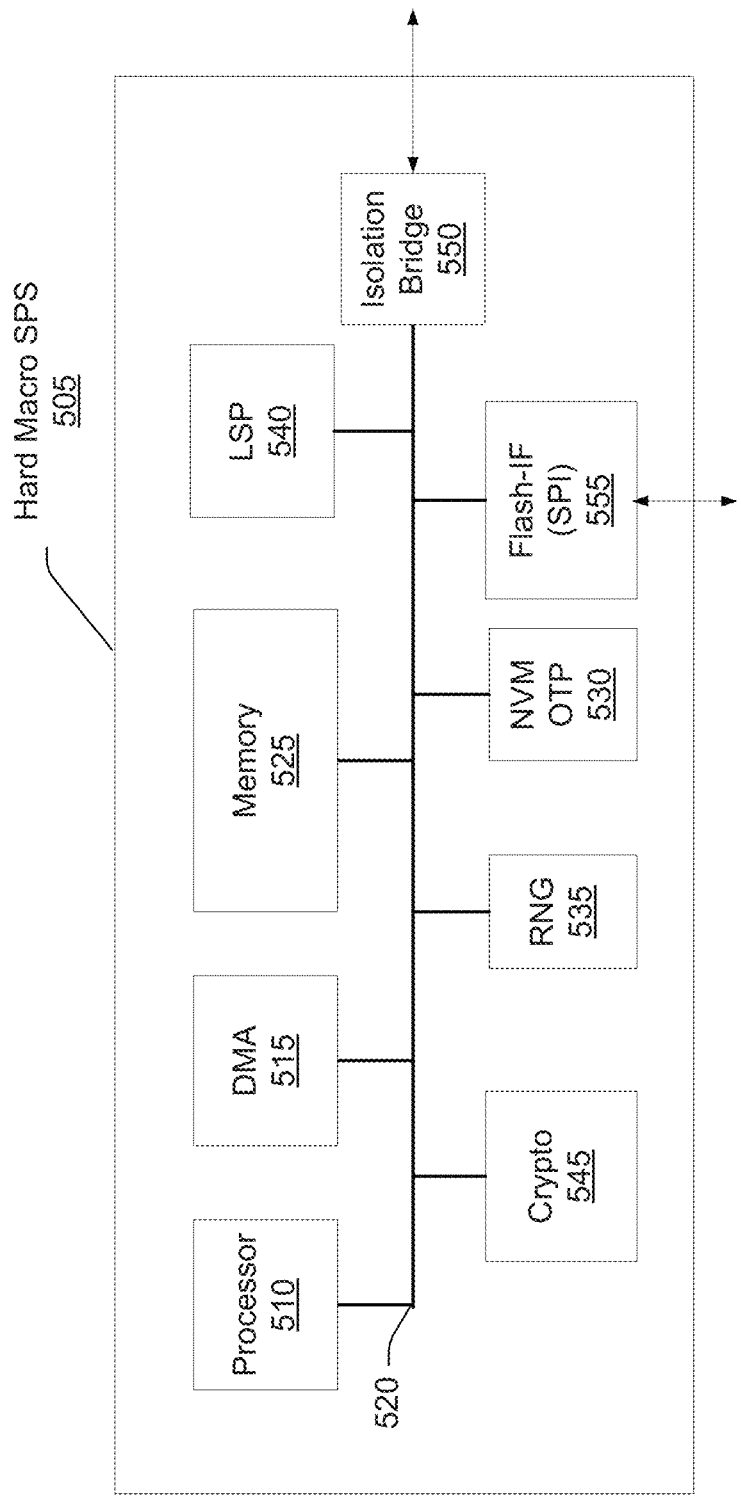
FIG. 5 illustrates an example secure processing sub-system configuration.

FIG. 5 illustrates an example representation of a hard macro SPS 505, which may be an embodiment of the hard macro SPS 405 of FIG. 4. The hard macro SPS 405 may be controlled by a processor 410. In accordance with various embodiments, this processor 410 may be a customized implementation of an ARM architecture secure processor core that executes low-level boot code, cryptographic libraries, and security IC embedded software, and may communicate with other elements of the hard macro SPS 505 over encrypted bus (matrix) 520. Also in accordance with various embodiments, the processor 510 may have cached memory to enhance performance, as well as a memory protection unit (MPU) to provide resource partitioning between various software tasks.

A DMA controller 515 may be utilized by the hard macro SPS 505 to accelerate data transfers and act as a hardware partitioned bus master for the encrypted bus 520, where the encrypted bus 520 may provide enhanced protection for the hard macro SPS 505 by having all accesses within the hard macro SPS 505 occur over the encrypted bus 520. It should be noted that the encrypted bus 520 may support encryption of both address and data busses.

Memory 525 of the hard macro SPS 505 may include integrated SRAM, ROM, as well as a hardware memory protection unit (HMPU), and a secure patch mechanism. Data in the SRAM may be stored in an encrypted format, and the HMPU may provide hardware partitioning between masters within memory segments. The ROM may hold IC dedicated support and test software, boot firmware, and any static portions of the aforementioned security IC embedded software. Like the SRAM, data in the ROM may be encrypted. Additionally, the secure patch mechanism may be utilized for the ROM, where all patches can be encrypted and authenticated by secure boot firmware. Upon initialization, the IC dedicated support software (FW.SPS_Boot and FW.SPS_Flash may support loading of a patch image.

Configuration and device-unique information may be handled by NVM-OTP 530. True random number generation (TRNG) and pseudo RNG (PRNG) may be supported by the hard macro SPS 505. A TRNG generator (which may be considered a part of the TOE, i.e., the hard macro SPS 505) may fulfill requirements of the RNG functionality class PTG.2 of the AIS 31. AIS 31 may refer to one method for evaluating physical RNG generators that detect a total entropy source failure and non-tolerable statistical defects of the internal random numbers, along with a stochastic model of the entropy source and statistical tests of the random raw numbers (as opposed to the internal random numbers).

As previously described, an internal secure clock domain within the hard macro SPS 505 may be completely isolated and asynchronous from all other external clocks. A low speed peripheral (LSP) 540 may contain times, security sensors, and clock generation controls for the hard macro SPS 505.

Cryptographic processing engine(s) 545 can allow the hard macro SPS 505 hardware to support accelerators for encryption/cryptographic operations (as described above, for example) according to the Advanced Encryption Standard (AES), hash-based message authentication code (HMAC), cyclical redundancy checks (CRC), and triple data encryption algorithm (TDES). Secure boot firmware may support a cryptographic library, which will be discussed in greater detail below, and may provide support for additional symmetric cryptographic operations such as, e.g., secure hash algorithm (SHA) 384.

Additionally, the hard macro SPS 505 may implement key generation and asymmetric cryptographic acceleration using a dedicated public key accelerator (PKA) module. Again, the secure boot firmware may support a cryptographic library which in turn provides support for other operations, e.g., elliptic curve (EC) cryptography and encryption based on the Rivest-Shamir-Adleman (RSA) algorithm.

To achieve separation between the hard macro SPS 505 and a PPS, e.g., PPS 420 of FIG. 4, in accordance with various embodiments, an isolation bridge 550, which may be an embodiment of the isolation bridge 410 of FIG. 4, may be utilized. That is, and as indicated above, the isolation bridge 550 may isolate components of the hard macro SPS 505 (i.e., TOE) from external non-secure components, such as the PPS 420. This can ensure the confidentiality and integrity of the TOE (i.e., the hard macro SPS 505) as well as any associated user data by utilizing the isolation bridge 550 as the sole interface for TOE communication. The isolation bridge 550 can prevent secure data from leaking into the PPS 420, and may further ensure that the PPS 420 does not impact the hard macro SPS 505. For example, by isolating the PPS 420 from clocking information in the hard macro SPS 505, an asynchronous TOE boundary may be maintained between the hard macro SPS 505 and the PPS 420, which in turn, can prevent non-secure elements outside of the hard macro SPS 505 from detecting information traveling on buses therein, e.g., the encrypted bus 520.

The isolation bridge 550 may include dedicated memory buffers and mailboxes, as well as a discrete set of GPIO pins controlled by the hard macro SPS 505 to achieve, e.g., complete decoupling from the hard macro SPS 505. For example, the isolation bridge 550 may toggle data pathways to become open and closed, thereby coupling and decoupling elements/ components of the hard macro SPS 505 and the PPS 420, e.g., when loading non-secure and/or uncertified data onto a memory unit, transferring data therebetween, etc. Through the isolation bridge 550, the hard macro SPS 505 can accept and respond to ISO 7816 APDU commands.

Local flash memory interface 555 may be utilized (along with the isolation bridge 550) by the hard macro SPS 505 to access non-volatile storage as discussed above, where use of the local flash memory interface 555 and the isolation bridge 550 may be either exclusive or inclusive. The local flash memory interface 555 may be dedicated to enhance performance and availability of non-volatile storage, and may be configured as a hardware access port only, and protected from unauthorized use by the hard macro SPS 505. Furthermore, storage of any data outside of the hard macro SPS 505 may be cryptographically protected to ensure confidentiality and integrity, where the hard macro SPS 505 can detect any modification to data stored in external flash, such as the local flash memory 305.

Hard macro SPS 505 firmware in the ROM may support security IC embedded software. Such low-level firmware may include three primary modules: the secure boot loader (i.e., FW.SPS_Boot for initializing the security IC embedded software and transferring control thereto after completion of the boot process); the cryptographic library (i.e., FW.SPS_Crypto for providing control and access to hard macro SPS 505 cryptographic accelerator hardware blocks and additional cryptographic functionality, as described above); and a secure flash memory driver (FW.SPS_Flash for providing secure read/write/erase capabilities for either the local flash memory, e.g., local flash memory 305 or host device flash memory, e.g., UICC 360, interfaced through the isolation bridge 550). It should be noted that the scope of certification of the hard macro SPS 505 may include RSA signature generation and verification, RSA key generation, elliptic curve Diffie-Hellman (ECDH) key exchange, EC digital signature algorithm (ECDSA) signature generation and verification, EC key pair generation, AES, and DES, secure has computation and CRC computation. The ROM may further include static portions of the security IC embedded software, which can include the middle layer operating system (OS), and although such static portions may reside in the ROM, such static portions need not be considered to be a part of the TOE.

As described above, DRM mechanisms may be utilized to provide mobile pay TV content/services. Accordingly, porting CA functions for key handling to an eSE on a mobile device can provide a platform capable of meeting security requirements for DRM without adding additional cost(s). Additionally, the high security level of an eSE can provide an ideal location to execute the key handling for DRM applications, where the addition of a unique identifier into the datapath decryptor can provide a low cost method of transferring DRM secrets/private keys without compromising the security from the eSE to the security core in the application processor.

It should be noted that various embodiments may be adapted for implementation in other contexts, where, e.g., even though as indicated previously, use of a SIM may not necessarily be ideal, key handling and partitioning as described herein may be implemented in a SIM card that acts as an SE. Additionally, partitioning of the content encryption functionality into an SE may be accomplished with a high speed path between memory and the SE.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
  an enclosure;
  a semiconductor chip within the enclosure, the semiconductor chip comprising a secure partition configured to process a media signal and store a key; and
  a secure element within the enclosure, the secure element configured to perform key handling of at least one digital rights management (DRM) scheme, wherein the secure element is separate from the semiconductor chip and is physically connected to the semiconductor chip within the enclosure via a secure cryptographic channel over at least one on-board wire connection, the secure partition of the semiconductor chip being further configured to decrypt communications received from the secure element over the secure cryptographic channel.

2. The apparatus of claim 1, wherein the at least one on-board wire connection couples at least one pin of the secure element to at least one pin of the semiconductor chip.

3. The apparatus of claim 1, wherein the secure partition is bound to the secure element during manufacturing of the apparatus.

4. The apparatus of claim 3, wherein binding of the secure partition to the secure element comprises one of a symmetric or certificate based binding.

5. The apparatus of claim 1, wherein performance of the key handling comprises encrypting a private key associated with the DRM scheme with a first key, and over encrypting the encrypted private key with a second key.

6. The apparatus of claim further comprising a key router within the secure partition, the key router configured to receive the over encrypted private key.

7. The apparatus of claim further comprising hardware within the secure partition, the hardware configured to decrypt the over encrypted private key initially using the first key, and subsequently using the second key.

8. The apparatus of claim 5, wherein the first and second keys are known and accessible only to secure hardware of the secure partition and the secure element.

9. The apparatus of claim 1, further comprising an external memory circuit that is communicatively coupled to the secure element, wherein the at least one wire connection comprises a universal asynchronous receiver transmitter (UART) connection.

10. An apparatus, comprising
  a secure element configured to handle digital rights management (DRM) private keys;
  a host processor configured to control the secure element; and
  a key router configured to receive and decrypt encrypted DRM private keys from the secure element, wherein the host processor and the key router are co-located on a system-on-a-chip (SoC), the secure element is physically connected to the key router within the apparatus via a secure cryptographic channel over an on-board connection, and the secure element is separate from the SoC.

11. The apparatus of claim 10, wherein the secure cryptographic channel is based upon an encoded identifier that is bound to the secure element.

12. The apparatus of claim 10, wherein the SoC includes hardware within a secure partition, the hardware configured to decrypt the encrypted DRM private keys utilizing two keys.

13. The apparatus of claim 12 further comprising a memory unit into which the decrypted DRM private keys are deposited.

14. The apparatus of claim 13 further comprising common DRM framework software running on the host processor, the common DRM framework software configured to pass the decrypted DRM private keys back to the hardware from the memory unit.

15. The system of claim 14, wherein the decrypted DRM private keys are utilized for rendering protected media content received by the system.

16. A system, comprising:
  a host device comprising a host processor;
  a secure element comprising:
    a secure processing sub-system implemented as a hard macro configured to process media content; and
    a peripheral processing sub-system configured to relay communications to and from the secure processing sub-system and the host device, wherein the secure processing sub-system is hardware isolated from the peripheral processing sub-system; and
  a system-on-chip (SoC) configured to implement set top box functionality within the host device, the SoC being exclusive of the secure element, the SoC being physically coupled to the secure element via an on-board connection and the SoC being further configured to decrypt communications received from the secure element over the on-board connection.

17. The system of claim 16, wherein the secure element is operatively connected to a media processing core with a secure partition of the SoC via a secure cryptographic channel over which keys for conditional access of media content are passed.

18. The system of claim 17 further comprising a memory unit to and from which decrypted versions of the keys for conditional access are passed by software running on the host processor.

19. The system of claim 18, wherein the decrypted versions of the keys are generated by decrypting encrypted versions of the keys for conditional access using a first unique key and a second global key.

20. The system of claim 19, wherein the first unique key and the second global key are unknown and inaccessible by the host processor.

* * * * *